United States Patent

[11] 3,580,349

| [72] | Inventors | Edward N. Brennan<br>9132 Edgewater Drive S. W., Tacoma, Wash. 98499;<br>Brian L. Brennan, 11616 Gorham, Los Angeles, Calif. 90049 |
|---|---|---|
| [21] | Appl. No. | 816,892 |
| [22] | Filed | Apr. 17, 1969 |
| [45] | Patented | May 25, 1971 |

[54] PORTABLE MOTORIZED CART
4 Claims, 11 Drawing Figs.

[52] U.S. Cl. .................................................. 180/27,
280/278, 280/287, 280/Dig. 5
[51] Int. Cl. ....................................................... B62k 15/00
[50] Field of Search .......................................... 180/25 (V),
26 (M), 27 (U), 26 (A); 280/278, 287, (MGC)

[56] References Cited
UNITED STATES PATENTS

| 3,004,619 | 10/1961 | Straussler | 180/27 |
| 3,042,132 | 7/1962 | Bouffort | 280/278X |
| 3,043,389 | 7/1962 | Steinberg | 180/27 |
| 3,249,171 | 5/1966 | Kinghorn | 180/27 |
| 3,369,629 | 2/1968 | Weiss | 180/27 |

FOREIGN PATENTS

| 1,063,146 | 12/1953 | France | 280/287 |
| 473,359 | 7/1952 | Italy | 280/287 |

*Primary Examiner*—Benjamin Hersh
*Assistant Examiner*—Milton L. Smith
*Attorney*—Roy E. Mattern, Jr.

ABSTRACT: A portable motorized cart useful for transporting a person and his golf clubs over a golf course, a person over a sand dune or beach, and/or a person around a industrial area, etc. The cart is conveniently adjusted to a smaller overall size for its over road transportation, for example, in the trunk space of an automobile. Compaction of the cart for such storage and travel involves tilting of a foot rest or floor, telescoping of frame members, tilting of steering and control means, and, as necessary, removal of a seat and a golf club rack.

INVENTORS
EDWARD N. BRENNAN
BRIAN L. BRENNAN
BY Roy Mattern ATTORNEY

INVENTORS.
EDWARD N. BRENNAN
BRIAN L. BRENNAN
BY Roy Mattern Jr. ATTORNEY

PORTABLE MOTORIZED CART

BACKGROUND OF INVENTION

Motorized golf carts are used now to transport two persons and their golf clubs over a golf course. When their respective shots travel in different directions and/or at different distances, either both persons are inconvenienced or at least one person is inconvenienced as the two man golf cart is driven between the respective shot directions and/or distances, or it is driven to the location of only one player's ball.

Moreover, once a round of golf is played the golf cart must remain at the golf course or be taken away on a trailer or a truck. Therefore golf carts are generally rented by players rather than being owned by them.

SUMMARY OF INVENTION

The individual golf cart of this invention may be individually owned. When completed it is carried to and from a golf course by an owner-player in his car trunk. Moreover, once in operation on a golf course, the golfer operates it to carry himself in the direction of his shot stopping nearby his ball for conveniently preparing for and playing his golf shot.

When not being used on a golf course, upon convenient removal of the golf bag bracket, the cart may be used for transportation elsewhere such as in and around an industrial plant and/or private estate. Moreover, upon interchanging the rear tires to a wider track tires, the cart may be used in traveling over sand, sand dunes, and other soft surface grounds.

At all times, the three wheel arrangement of each cart provides the stability needed when a person travels over irregular terrains. The rear two wheels are driven by an engine, generally through reduction gears. The front wheel is turned upon handle bar movements. Levers for accelerator and brake controls are secured to the handle bars.

Although gasoline engines are used quite extensively, the cart is also powered by an electric motor. In all models the engine is mounted between the rear wheels and both forward and above the rear axle. The operator sits just forward and above the rear axle and essentially over the engine.

DRAWINGS OF THE PREFERRED EMBODIMENT OF THE INVENTION

DESCRIPTION OF THE PREFERRED EMBODIMENT OF THE INVENTION

General Arrangement

Figure 1:
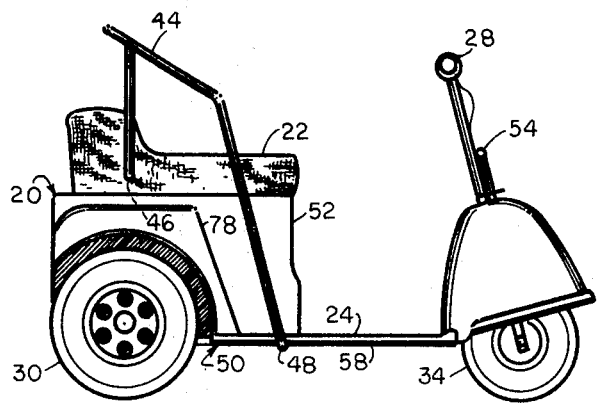
FIG. 1 is a right side view of the portable motorized cart equipped to carry a golf bag.
Figure 2:
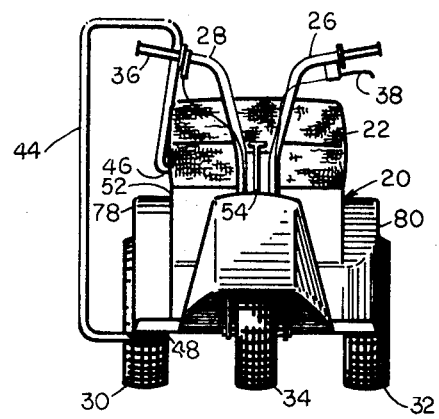
FIG. 2 is a front view of the cart shown in FIG. 1.
Figure 3:
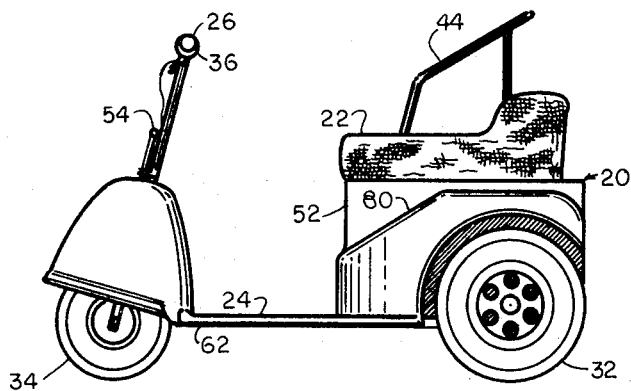
FIG. 3 is a left side view of the cart shown in FIG. 1.
Figure 4:
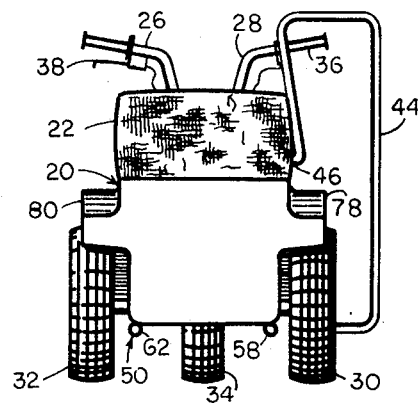
FIG. 4 is a rear view of the cart shown in FIG. 1.

As indicated in FIGS. 1, 2, 3, 4 and 11, a portable motorized cart 20 is arranged to carry a person, not shown, while he is sitting on a cushioned seat 22 with his feet resting on pivotal floor 24 and his hands gripping steering bars 26, 28. When so positioned he is located forward, above and between rear powered wheels 30, 32, and essentially aligned with the longitudinal center line passing through steerable front wheel 34. His golf bag 40 and clubs 42 are held in place by removable bracket 44 which is inserted sideways into a seat frame receiver 46 and into a frame receiver 48.

At respective steering bars 26, 28, he has a throttle collar or rotatable grip 36 to control the speed and a braking lever 38 to control the deacceleration. Throttle controls 36 are conventional and transmit a motion to the engine 51 which is supported on overall frame 50 within body 52. Braking lever 38 is conventional and transmits a motion to a shaft-braking mechanism, not shown, that is connected to the main drive shaft, now shown, of the engine 51. The engine 51 may be an internal combustion engine, or an electric motor 51, may be used.

Compaction for Handling, Transporting and Storage

Figure 5:
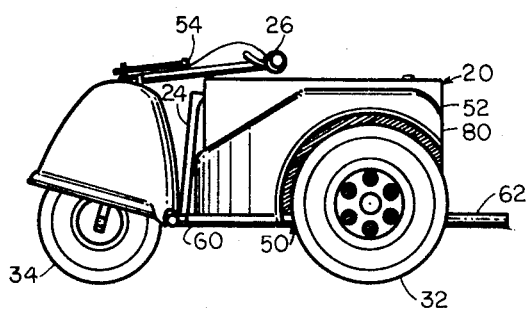
FIG. 5 is a left side view of the cart shown in FIG. 1, compacted for auto trunk storage, a seat and golf club rack having been removed.
Figure 6:
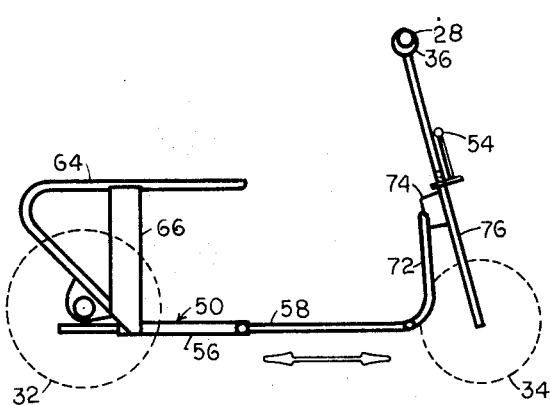
FIG. 6 is a right side view of the principal frame members of the cart of FIG. 1, the wheels being shown in dotted lines and an arrow indicating the compacting or telescoping range of the frame that is shown fully extended for use.
Figure 7:
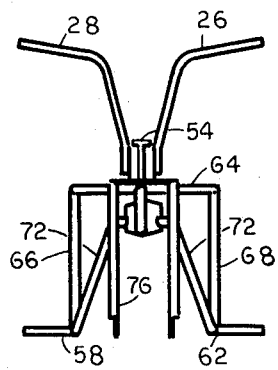
FIG. 7 is a front view of the principal framing of the cart of FIG. 1.
Figures 8, 9:
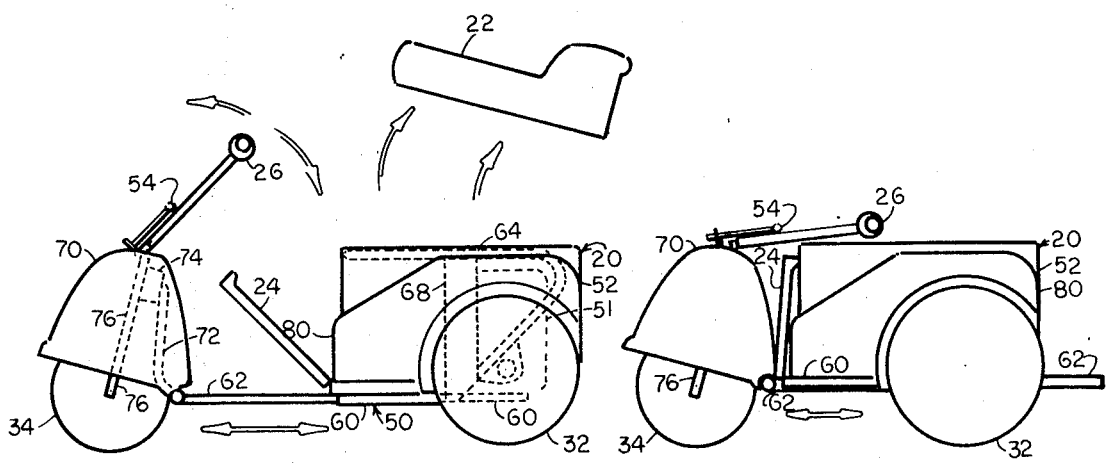
FIG. 8 is a schematic left side view of the cart of FIG. 1 indicating more clearly, using dotted lines, the framing shown in FIG. 6, engine location, and also indicating by motion arrows the compaction steps, including the seat removal.
FIG. 9 is a schematic side view of the cart of FIG. 1, indicating completion of the compaction.
Figure 11:
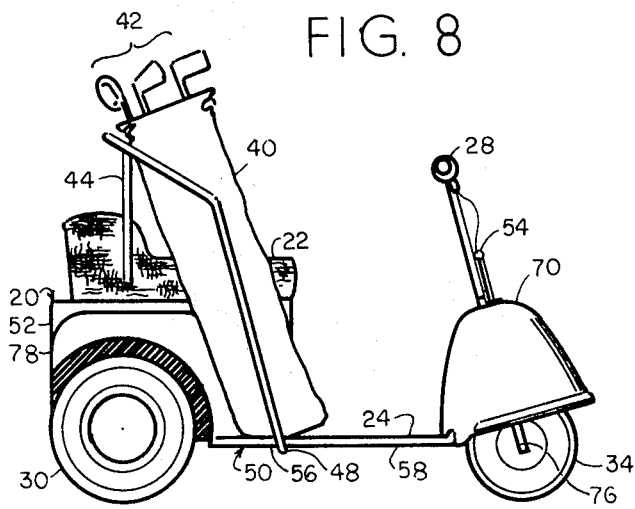
FIG. 11 is a right side view of the cart of FIG. 1 showing how a golf bag is supported by a bracket on the cart as the cart is extended ready for golf course operation.
Figure 10:
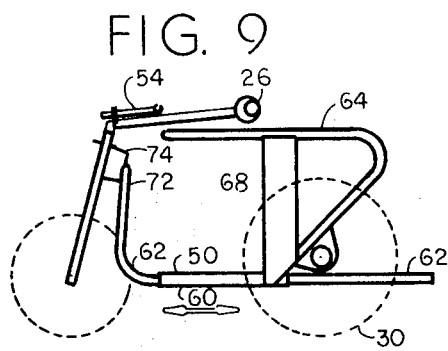
FIG. 10 is a schematic side view of the framing of the cart of FIG. 1, indicating completion of the compaction.

Beyond providing this conveniently arranged one person vehicle 20, particularly designed for a golfer as he travels over a golf course, cart 20 is also particularly designed for its convenient handling, transporting, and storage, after a golf game is over. As indicated in FIGS. 5, 9 and 10, cart 20 is easily compacted into a smaller overall volume. When necessary, seat 22 may be removed as shown by motion arrows in FIG. 8. Also, steering bars 26, 28, upon and after an upward pull on a latch handle mechanism 54, may be pivoted down and back over body 52. As noted previously, golf bag bracket 44 is removable.

At this time further and very desirable compaction of the overall volume occurs as floor 24 is pivoted up to a near vertical position and the overall frame 50 is shortened. Such shortening is accommodated by telescoping frame members 56, 58, 60, 62. The rearward ends of smaller diameter frame members 58 and 62 are thereafter exposed becoming hand gripping places. They are used when cart 20 is lifted into a car trunk or other place for its transportation and/or storage until the next golf game is to be played, or the cart is to be used elsewhere, at the beach or at a factory, etc.

As noted previously and viewed in FIG. 8, a body 52 is used to cover the engine 51 and rear frame 64 inclusive of side braces 66, 68. Also a cover 70 is placed over forward frame 72 and its pivotal connection 74 to front wheel fork 76. This wheel fork 76 receives latch handle mechanism 54 used in pivoting steering bars 26, 28. Body 52 and cover 70 are optionally used to cover up these working components to keep a person from being caught in them during operations. They are also used to improve the appearance of the cart. Moreover, they do not increase the overall volume resulting upon the convenient compaction of cart 20 for handling transportation and/or storage. Body 52 optionally includes right and left fenders 78, 80.

Summary of Advantages

Cart 20, easily transported in a car to its place of use; then easily lifted from a car to the ground; thereafter quickly expanded and assembled for operation, provides its owner and/or user with a personalized vehicle ready to go following his setting of the controls. When so operated he safely rides over the terrain of a golf course, roadways of a manufacturing plant, trails of the countryside, and, possibly with wider tires, the sands of ocean beaches, etc.

We claim:

1. Portable motorized cart compacted for handling, transporting, and storage, and extended for operations over a golf course, private property, trails, factory property, and beaches, comprising:

a. an overall frame, having a front portion to receive a rotatable front wheel fork, a central portion of telescoping members to reduce the overall frame length upon compaction, and to support a pivotal floor, and a rear portion to support two transversely spaced drive wheels, an engine, a housing, and a seat;
b. a front wheel fork rotatably mounted to the front portion of the frame;
c. a front wheel rotatably supported by the front wheel fork;
d. a latching means secured to the front wheel fork;
e. a pivotal and rotatable handle bars means secured through operation of the latching means to the front wheel fork;
f. a pivotal floor section secured to the central portion of the frame for raising clear of the telescoping frame portions during compaction;
g. transversely spaced drive wheels secured to the rear portion of the overall frame;
h. an engine secured to the rear portion of the overall frame;
i. an engine housing secured to the rear portion of the overall frame; and
j. a seat removably secured to the engine housing.

2. Portable motorized cart, as claimed in claim 1, comprising, in addition, a golf bag bracket removably secured to the side of the cart by transverse motion entry slots at the seat cushion and rear frame portion.

3. Portable motorized cart, as claimed in claim 1, comprising, in addition, throttle controls extending from the handle bars to the engine.

4. Portable motorized cart, as claimed in claim 1, comprising, in addition, braking controls extending from the handle bars to the engine location.